United States Patent
Kim et al.

(10) Patent No.: US 10,704,301 B2
(45) Date of Patent: Jul. 7, 2020

(54) SAFETY EXIT ASSIST SYSTEM AND METHOD THEREFOR

(71) Applicants: Hyundai Motor Company, Seoul (KR); Kia Motors Corporation, Seoul (KR)

(72) Inventors: Seok Min Kim, Incheon (KR); Ji Heon Kwon, Seoul (KR); Chi Young Min, Bucheon-si (KR); Myoung Kwon Je, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 358 days.

(21) Appl. No.: 15/855,732

(22) Filed: Dec. 27, 2017

(65) Prior Publication Data

US 2019/0194982 A1    Jun. 27, 2019

(51) Int. Cl.
| | |
|---|---|
| *B60R 25/01* | (2013.01) |
| *E05B 77/26* | (2014.01) |
| *E05B 77/04* | (2014.01) |
| *E05B 77/48* | (2014.01) |
| *B60Q 9/00* | (2006.01) |
| *E05B 81/64* | (2014.01) |
| *E05B 81/72* | (2014.01) |
| *E05B 17/10* | (2006.01) |
| *E05B 77/54* | (2014.01) |
| *E05B 77/12* | (2014.01) |

(52) U.S. Cl.
CPC .............. *E05B 77/265* (2013.01); *B60Q 9/00* (2013.01); *B60R 25/01* (2013.01); *E05B 17/10* (2013.01); *E05B 77/04* (2013.01); *E05B 77/12* (2013.01); *E05B 77/26* (2013.01); *E05B 77/48* (2013.01); *E05B 77/54* (2013.01); *E05B 81/64* (2013.01); *E05B 81/72* (2013.01)

(58) Field of Classification Search
CPC ........ E05B 77/265; E05B 77/26; E05B 77/54; E05B 77/12; E05B 77/04; E05B 77/48; E05B 81/64; E05B 81/72; E05B 17/10; B60Q 9/00; B60R 25/01
See application file for complete search history.

(56) References Cited

U.S. PATENT DOCUMENTS

| | | | |
|---|---|---|---|
| 5,894,906 A | 4/1999 | Weber | |
| 6,998,969 B2 * | 2/2006 | Aiyama | .................. E05B 77/12 180/271 |

(Continued)

FOREIGN PATENT DOCUMENTS

| | | |
|---|---|---|
| JP | H10-140899 A | 5/1998 |
| JP | 2008-144418 A | 6/2008 |

(Continued)

*Primary Examiner* — Ian Jen
(74) *Attorney, Agent, or Firm* — Morgan, Lewis & Bockius LLP (57) ABSTRACT

A safety exit assist system and a method therefor are provided. The system includes a plurality of child lock latches configured to be respectively located in left and right doors of a vehicle and execute child lock or child lock release and a controller configured to control the plurality of child lock latches and instruct the plurality of child lock latches to execute the child lock if receiving a proximity warning signal relative to a rear of the vehicle from a blind spot detection (BSD) device.

14 Claims, 7 Drawing Sheets

(56) References Cited

U.S. PATENT DOCUMENTS

| | | | | |
|---|---|---|---|---|
| 7,352,081 B2* | 4/2008 | Taurasi | ............... | B60R 25/00 |
| | | | | 180/272 |
| 7,434,650 B2* | 10/2008 | Hofbeck | ............ | B60R 25/20 |
| | | | | 180/281 |
| 9,809,164 B2* | 11/2017 | Matsuno | ............... | B60Q 9/00 |
| 9,896,096 B2* | 2/2018 | Newman | ............ | B60Q 9/008 |
| 10,077,582 B2* | 9/2018 | Ring | .................. | E05B 77/22 |
| 2005/0146215 A1* | 7/2005 | Kachouh | ............ | E05B 77/24 |
| | | | | 307/10.1 |
| 2010/0225522 A1* | 9/2010 | DeMersseman | ......... | G01S 7/03 |
| | | | | 342/72 |
| 2012/0154591 A1* | 6/2012 | Baur | ..................... | B60R 1/00 |
| | | | | 348/148 |
| 2012/0218124 A1* | 8/2012 | Lee | .................. | B60W 50/14 |
| | | | | 340/904 |
| 2013/0002414 A1* | 1/2013 | Konet | ................ | B60K 37/06 |
| | | | | 340/436 |
| 2013/0113923 A1* | 5/2013 | Chien | .................. | B60R 1/00 |
| | | | | 348/135 |
| 2013/0135089 A1* | 5/2013 | Sejalon | ............... | G08G 1/167 |
| | | | | 340/435 |
| 2014/0297133 A1 | 10/2014 | Oikawa | | |
| 2016/0288799 A1* | 10/2016 | Nguyen Van | ......... | G01S 7/40 |
| 2017/0144617 A1* | 5/2017 | Lee | .................. | B60W 30/182 |

FOREIGN PATENT DOCUMENTS

| | | |
|---|---|---|
| JP | 2011-111069 A | 6/2011 |
| JP | 2014-190124 A | 10/2014 |
| KR | 10-2014-0050472 A | 4/2014 |
| KR | 10-1417057 B1 | 7/2014 |
| KR | 10-2018-0002418 A | 1/2018 |

\* cited by examiner

SAFETY EXIT ASSIST SYSTEM AND METHOD THEREFOR

TECHNICAL FIELD

The present disclosure relates to technologies of using child lock, and more particularly, relates to interwork with a safety device to assist passengers to safely alight from a vehicle.

BACKGROUND

In general, a rear seat of a vehicle is equipped with a lock for child protection (hereinafter referred to as "child lock") for preventing a child from randomly opening a rear seat door in the vehicle when the child rides in the vehicle.

A child lock function is a function of prohibiting a passenger from opening a door in only the inside of a vehicle as compared with a door lock function of prohibiting a passenger from opening a door in the inside and outside of the vehicle.

Such a child lock may have a mechanical type of being operated by inserting a key into a lock lever hole of a rear door and an electronic type of driving a child lock function by turning on/off a switch.

Figure 1:
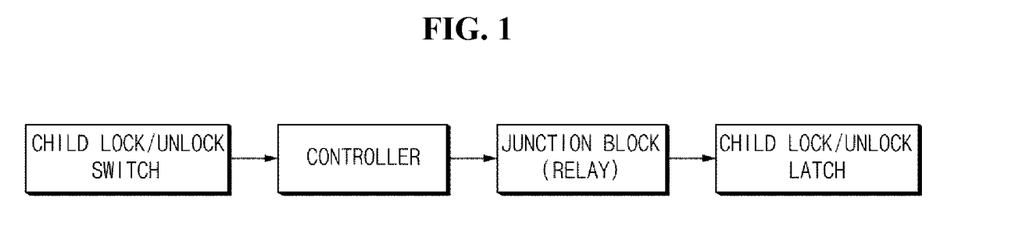
FIG. 1 is a block diagram illustrating a configuration of a conventional electronic child lock device.

As shown in FIG. 1, in a conventional electronic child lock, if detecting an operation of a child lock/unlock switch, a controller may supply power to a child lock/unlock latch through a junction block in response to the operation state and may control the child lock/unlock latch to perform a child lock or unlock function.

SUMMARY

The present disclosure has been made to solve the above-mentioned problems occurring in the prior art while advantages achieved by the prior art are maintained intact.

An aspect of the present disclosure provides a safety exit assist system for executing a child lock function which interworks with a vehicle safety device to assist a passenger to safely alight from a vehicle and a method therefor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a safety exit assist system may include: a plurality of child lock latches configured to be located in left and right doors of a vehicle and execute child lock or child lock release and a controller configured to control the plurality of child lock latches and instruct the plurality of child lock latches to execute the child lock if receiving a proximity warning signal relative to a rear of the vehicle from a blind spot detection (BSD) device.

According to another aspect of the present disclosure, a safety exit assist method for assisting a passenger to safely alight from a vehicle by controlling a plurality of child lock latches configured to execute child lock or child lock release at at least one processor may include: verifying whether a proximity warning signal relative to a rear of the vehicle is received from a BSD device and, if the proximity warning signal is received, instructing the plurality of child lock latches to execute the child lock.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The aforementioned objects of the present disclosure and the other objects, advantages, features, and methods of accomplishing the same will become apparent with reference to embodiments described in detail below together with the accompanying drawings. However, the present disclosure is not limited by embodiments disclosed hereinafter, and may be implemented in various forms. Rather, these embodiments are provided to so that this disclosure will be through and complete and will fully convey the concept of the invention to those skilled in the art, and the present disclosure will only be defined by the appended claims. Meanwhile, terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein but do not exclude presence of addition of one or more other components, steps, operations, and/or elements other than stated components, steps, operations, and/or elements.

Figure 2:
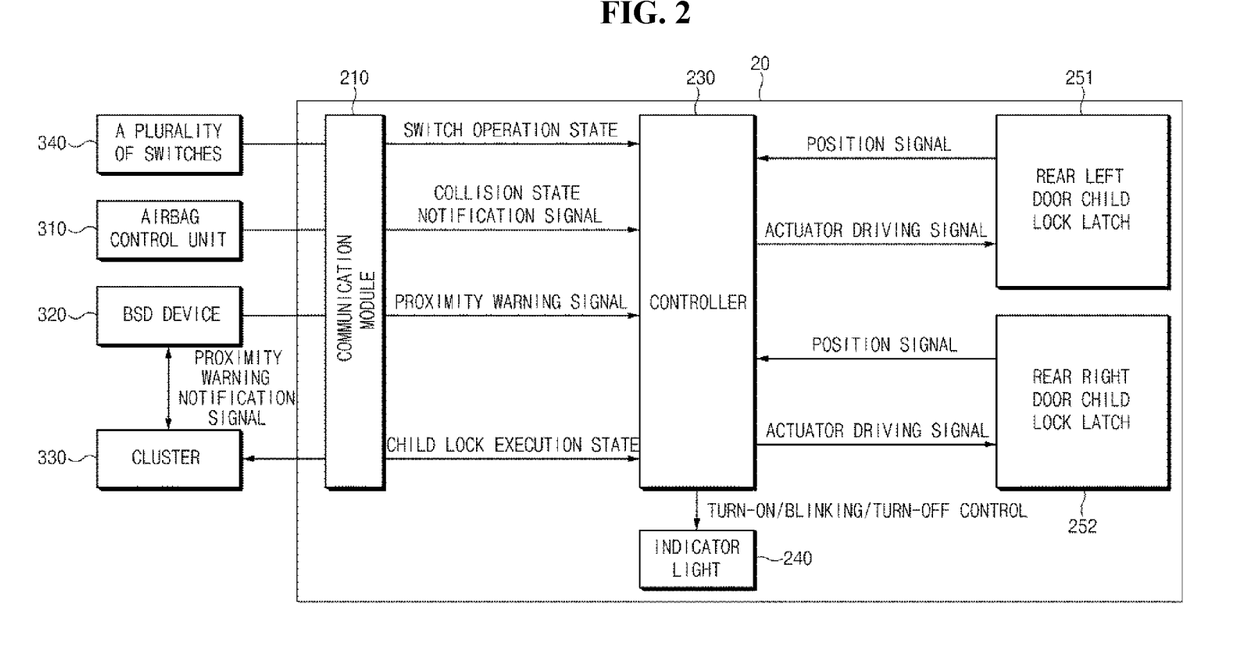
FIG. 2 is a block diagram illustrating a safety exit assist system according to an embodiment of the present disclosure.
Figure 3:
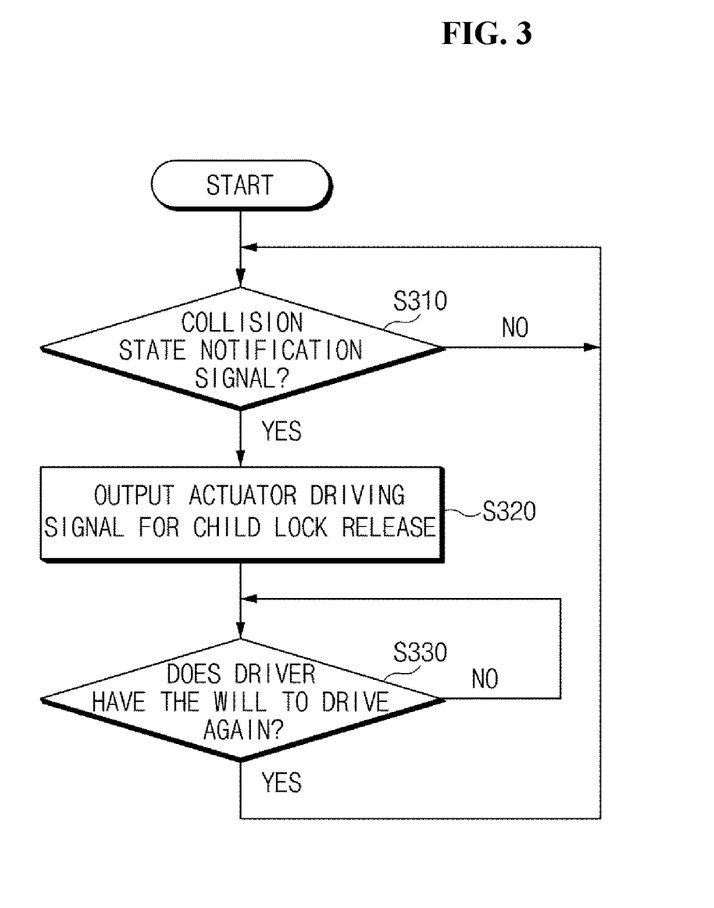
FIG. 3 is a flowchart illustrating a safety exit assist method according to a collision state notification signal according to an embodiment of the present disclosure.
Figure 4A:
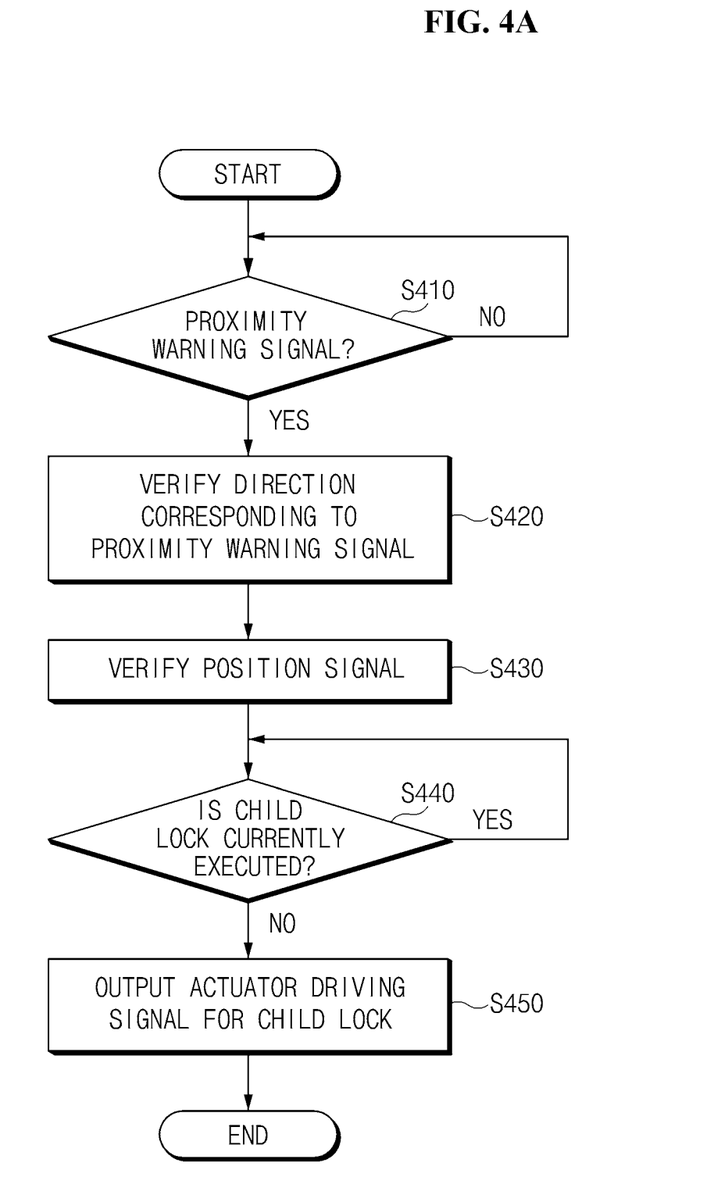
FIGS. 4A and 4B are a flowchart and a drawing illustrating a safety exit assist method according to a proximity warning signal according to an embodiment of the present disclosure.
Figure 4B:
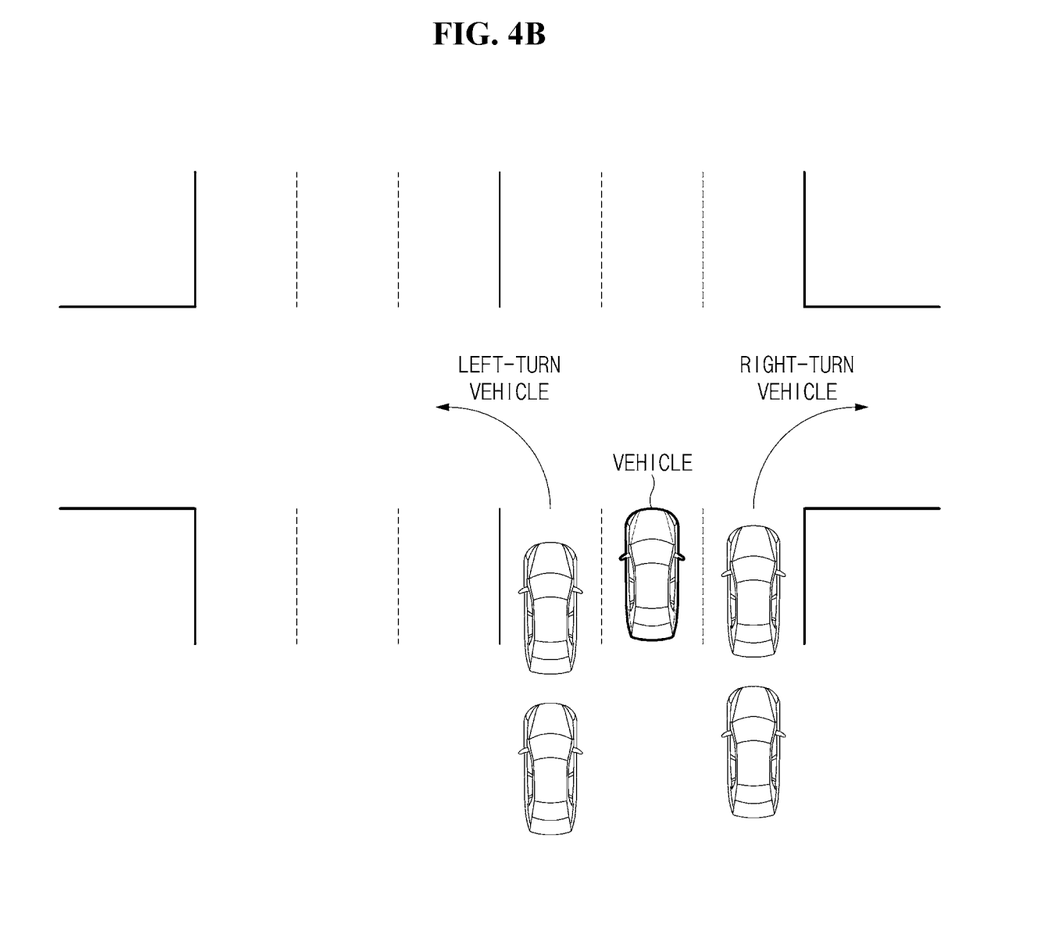
Figure 5:
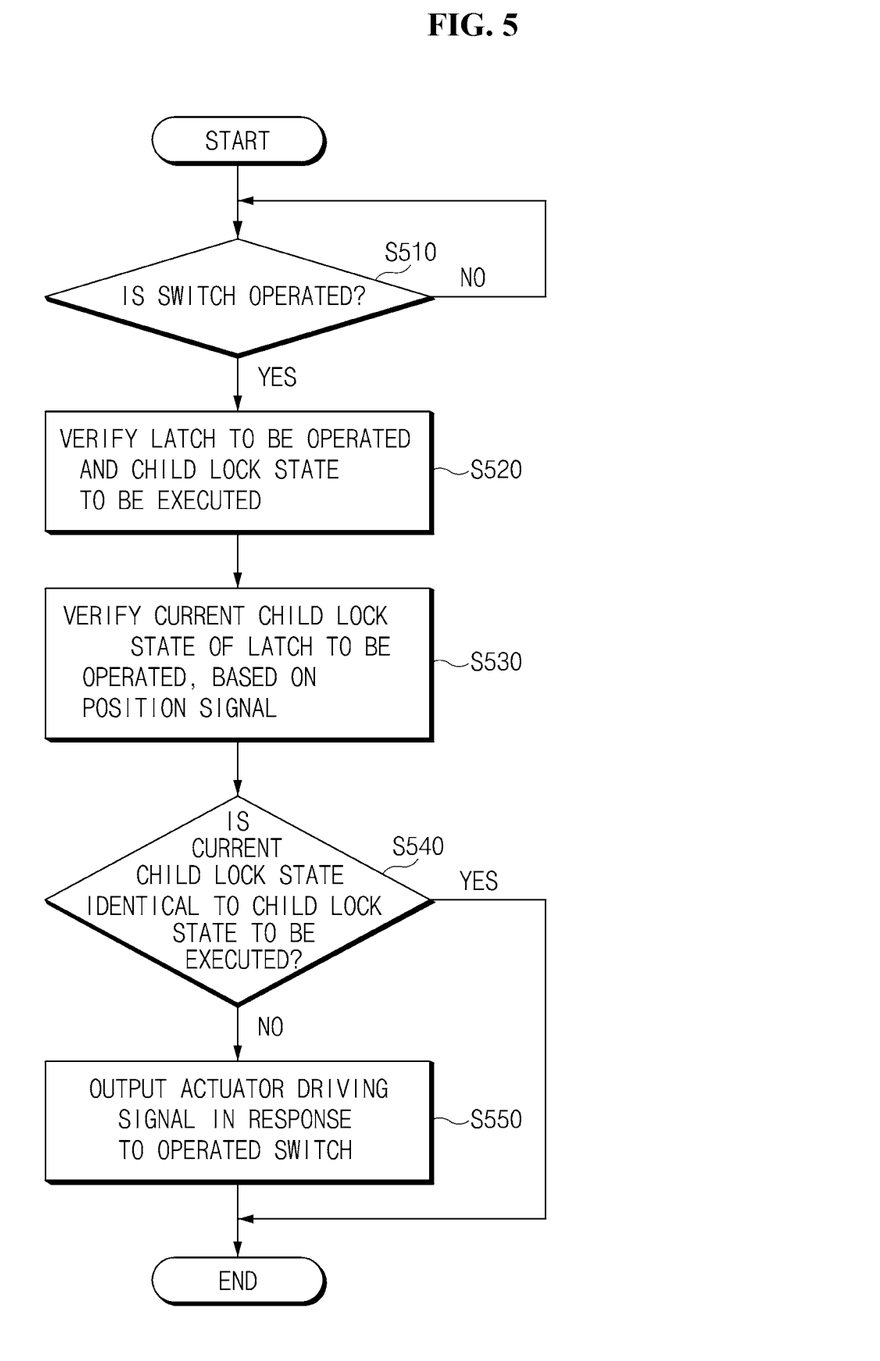
FIG. 5 is a flowchart illustrating a child lock execution method according to an operation of each of a plurality of switches according to an embodiment of the present disclosure.
Figure 6:
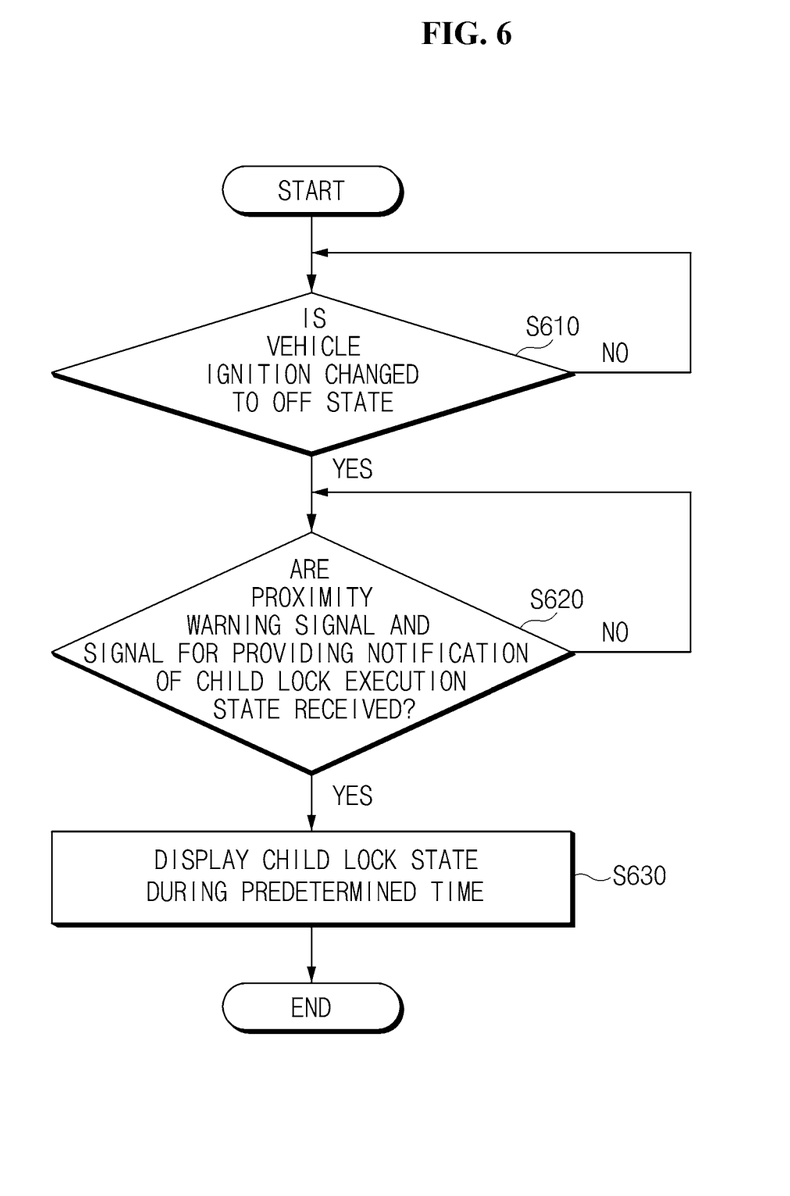
FIG. 6 is a flowchart illustrating a method for displaying a child lock execution state according to an embodiment of the present disclosure.

Hereinafter, a description will be given in detail of an embodiment of the present disclosure with reference to the accompanying drawings. FIG. 2 is a block diagram illustrating a safety exit assist system according to an embodiment of the present disclosure. FIG. 3 is a flowchart illustrating a safety exit assist method according to a collision state notification signal according to an embodiment of the present disclosure. FIGS. 4A and 4B are a flowchart and a drawing illustrating a safety exit assist method according to a proximity warning signal according to an embodiment of the present disclosure. FIG. 5 is a flowchart illustrating a child lock execution method according to an operation of each of a plurality of switches according to an embodiment of the present disclosure. FIG. 6 is a flowchart illustrating a method for displaying a child lock execution state according to an embodiment of the present disclosure.

As shown in FIG. 2, a safety exit assist system 20 may include a communication module 210, an indicator light 240, a plurality of child lock latches 251 and 252, and a controller 230.

The communication module 210 may support vehicle network communication between the controller 230 and an airbag control unit 310, a blind spot detection (BSD) device 320, or a cluster 330. In detail, if receiving a signal for vehicle network communication from each of the airbag control unit 310, the BSD device 320, and the cluster 330, the communication module 210 may convert the received signal into a signal capable of being analyzed by the controller 230 and may transmit the converted signal to the controller 230. Further, the communication module 210 may convert a signal from the controller 230 into a signal for vehicle network communication and may transmit the converted signal to the cluster 330.

Herein, if detecting occurrence of vehicle collision by its sensor, airbag deployment, or the like, the airbag control unit 310 may transmit a collision state notification signal for providing notification of a vehicle collision state over a vehicle network.

Further, if verifying a proximity object from a rear (left or right) side by its sensor or the like, the BSD device 320 may provide notification of the risk of a collision over a vehicle network.

If receiving a signal for providing notification of a child lock execution state from the controller 230, the cluster 330 may display the child lock execution state during a predetermined time.

The indicator light 240 may be turned on, blinked, or turned off according to an instruction of the controller 230 to display a child lock execution state. The indicator light 240 may be installed in a position capable of being recognized by a driver and may be included in the cluster 330.

The plurality of child lock latches 251 and 252 may be located in left and right doors of a vehicle to execute child lock and child lock release depending on an actuator driving signal from the controller 230.

In general, child lock latches are located in rear left and right doors. Thus, in the specification, a description will be given of an example in which the plurality of child lock latches 251 and 252 include the rear left door child lock latch 251 and the rear right door child lock latch 252.

If detecting at least one variable among an operation state of each of the plurality of switches 340, a proximity warning, and a collision state or a change in the at least one variable, the controller 230 may provide an actuator driving signal to at least one of the plurality of child lock latches 251 and 252. Thus, the controller 230 may execute child lock or child lock release by at least one of the plurality of child lock latches 251 and 252.

Herein, the plurality of switches 340 may be switches for child lock or child lock release, manually operated by a user. For example, the plurality of switches 340 may be located around the plurality of child lock latches 251 and 252 for executing child lock. Such a plurality of switches 340 may inform the controller 230 of a switch operation state over a vehicle network.

In this case, the controller 230 may control each of the plurality of child lock latches 251 and 252 in order of a collision state, a proximity warning, and a switch operation state. Hereinafter, a description will be given of execution of child lock/child lock release corresponding to each variable of the controller 230 with reference to FIGS. 3 to 6.

① Child Lock Release According to a Collision State

Referring to FIG. 3, if a collision state notification signal from the airbag control unit 310 is verified in operation S310, in operation S320, the controller 230 may output an actuator driving signal for child lock release. Herein, if the indicator light 240 is already turned on or on/off, the controller 230 may turn off the indicator 240 indicating that child lock is being executed.

Thereafter, until a driver has the will to drive again (e.g., a vehicle ignition is turned on) after the vehicle ignition is turned off by the airbag control unit 310, in operation S330, the controller 230 may fail to perform child lock control according to the plurality of switches 340, a proximity warning state, and the like.

As described above, if executing child lock release according to the collision state notification signal, although receiving a proximity warning signal or verifying an operation of at least one of the plurality of switches 340 until verifying release of a vehicle collision state, the controller 230 may ignore the reception or the verification. Thus, an embodiment of the present disclosure may prevent a problem in which it is impossible for a passenger in a vehicle to escape from the vehicle due to child lock if a collision actually occurs.

Further, if a collision state notification signal is not received, the controller 230 may perform child lock or child lock release in response to reception of a proximity warning signal and an operation of each of the plurality of switches 340.

Meanwhile, if verifying that the vehicle ignition is turned on again after the vehicle ignition is turned off due to a collision state, the controller 230 may control child lock in response to a collision state notification signal, a proximity warning signal, and an operation of each of the plurality of switches 340.

As such, the controller 230 may execute collision control according to a collision state notification signal from the vehicle ignition is turned on before a driver's seat door is opened.

② Child Lock Execution According to a Proximity Warning

Referring to FIG. 4A, if a proximity warning signal from the BSD device 320 is verified in operation S410, in operation S420, the controller 230 may verify whether there is a proximity warning for any of a rear left direction or a rear right direction.

In operation S430, the controller 230 may verify a position signal from the child lock latch 251 or 252 corresponding to the verified direction.

In operation S440, the controller 230 may verify whether child lock is currently executed, from the position signal.

If the child lock is currently released, in operation S450, the controller 230 may output an actuator driving signal for executing child lock.

On the other hand, as a result of the verification in operation S440, if the child lock is currently executed, the controller 230 may fail to separately output an actuator driving signal. Thus, the controller 230 according to an embodiment of the present disclosure may prevent an unnecessary actuator driving signal from being output not to change a child lock state actually and may prevent unnecessary power consumption.

For example, as shown in FIG. 4B, in a situation where a vehicle waits for going straight at an intersection, whenever a left-turn vehicle or a right-turn vehicle passes, an embodiment of the prevent disclosure may prevent child lock from being repeatedly generated.

Meanwhile, in the above-mentioned process, although verifying an operation of at least one of the plurality of switches 340, the controller 230 may ignore the verification. Thus, as an embodiment of the present disclosure controls a vehicle door not to be opened if there is a collision possibility when the vehicle door is opened due to an object behind a vehicle (although door lock is released), it may assist a passenger to safely alight from the vehicle.

Further, if a proximity warning signal is not received, the controller 230 may perform child lock or child lock release in response to an operation of each of the plurality of switches 340.

③ Child Lock/Child Lock Release According to a Switch Operation

If verifying an operation of at least one of the plurality of switches 340 in operation S510, in operation S520, the controller 230 may verify a latched to be operated, corresponding to the operated switch among the plurality of child lock latches 251 and 252, and a child lock state to be executed.

In operation S530, the controller 230 may verify a current child lock state of the latch to be operated, based on a position signal from the latch to be operated.

If the child lock state to be executed is not identical to the current child lock state in operation S540, in operation S550, the controller 230 may output an actuator driving signal to the latch to be operated, in response to the operated switch. Thus, the controller 230 may prevent an unnecessary actuator driving signal from being output not to change a child lock state actually and may prevent unnecessary power consumption.

Meanwhile, in the above-mentioned process, the controller 230 may earlier execute child lock or child lock release in response to a collision state notification signal and a proximity warning signal than an operation of at least one switch. Thus, an embodiment of the present disclosure may assist a passenger to safely alight from a vehicle.

④ Display of a Child Lock Operation State

The cluster 330 may display a child lock operation state according to a proximity warning signal. Hereinafter, a description will be given with reference to FIG. 6.

Referring to FIG. 6, if a vehicle ignition is changed from an on state to an off state in operation S610, in operation S620, the cluster 330 may verify whether a proximity warning signal and a signal for providing notification of a child lock execution state are received.

If the two signals are received as a result of the verification in operation S620, in operation S630, the cluster 330 may display a child lock state according to the proximity warning signal during a predetermined time.

In this case, the execution of operations 610 to 630 may be performed by a controller of the cluster 330.

Alternatively, in contrast, the controller 230 may actively control to display a child lock state. For example, if receiving a proximity warning signal from the BSD device 320 and executing child lock, the controller 230 may verify whether the vehicle ignition is changed to an off state. If the vehicle ignition is changed to the off state, the controller 230 may instruct the cluster 330 to display a child lock state. The cluster 330 may guide a child lock state due to a proximity lock during a predetermined time. Thus, an embodiment of the present disclosure may inform a driver of a child lock state by determination of a vehicle rather than a will of the driver.

Meanwhile, the controller 230 may display a child lock execution state corresponding to an operation state of each of the plurality of switches 340 through the indicator light 240.

In detail, if at least one of the plurality of switches 340 is operated, the controller 230 may turn on, on/off, or off the indicator light 240 in response to states of the rear left and right door child lock latches 251 and 252. In more detail, if both of the rear left and right door child lock latches 251 and 252 are in a child lock state, the controller 230 may turn on the indicator light 240. Alternatively, if one of the rear left and right door child lock latches 251 and 252 is in the child lock state, the controller 230 may turn on/off the indicator light 240. Alternatively, if both of the rear left and right door child lock latches 251 and 252 are in a child lock release state, the controller 230 may turn off the indicator light 240.

As such, an embodiment of the present disclosure may collectively determine vehicle states including a vehicle power, vehicle driving, a collision state, a child lock switch state, and a child lock latch state and environments such as a proximity warning of a rear side risk element and may execute child lock and child lock release. Thus, an embodiment of the present disclosure may assist a passenger who rides in a rear seat of a vehicle to safely alight from the vehicle.

Further, an embodiment of the present disclosure may prevent child lock or child lock release from being unnecessarily executed to reduce power consumption and may reduce an amount of logic computation to enhance marketability.

In addition, an embodiment of the present disclosure may be implemented without a higher increase in costs than a conventional electronic child lock system to be superior in ease of application.

According to an embodiment of the present disclosure, the safety exit assist system may assist to a passenger to safely alight from a vehicle.

While the present disclosure has been described with respect to the elements of the present disclosure with reference to the accompanying drawings, it will be apparent to those skilled in the art that various changes and modifications may be made without departing from the spirit and scope of the inventive concept. Therefore, the spirit and scope of the present disclosure is not limited thereto and should be interpreted by the following claims.

What is claimed is:

1. A safety exit assist system, the system comprising:
a plurality of child lock latches configured to be located in left and right doors of a vehicle and execute child lock or child lock release; and
a controller comprising at least one processor configured to:
control the plurality of child lock latches; receive a proximity warning signal for a rear of the vehicle from a blind spot detection (BSD) device;
verify a direction corresponding to the proximity warning signal between a rear left direction and a rear right direction of the vehicle;
verify a latch corresponding to the direction among the plurality of child lock latches;
verify a position signal from the latch corresponding to the direction; and
if verifying that the child lock is released by the position signal, instruct the latch corresponding to the direction to execute the child lock.

2. The system of claim 1, wherein the controller is configured to:

if verifying a collision state, execute the child lock release using the plurality of child lock latches.

3. The system of claim 2, further comprising:
a plurality of switches configured to manually operate the child lock,
wherein the controller is configured to:
if verifying the collision state, fail to execute the child lock according to an operation of each of the plurality of switches and the proximity warning signal verified after the collision state.

4. The system of claim 1, further comprising:
a plurality of switches configured to manually control the child lock,
wherein the controller is configured to:
if at least one of the plurality of switches is operated, verify an operation state of the at least one switch; and
instruct a latch corresponding to the at least one switch among the plurality of child lock latches to execute the child lock or the child lock release depending on the operation state.

5. The system of claim 4, wherein the controller is configured to:
verify a current child lock state based on a position signal from at least one of the plurality of child lock latches; and
if a child lock state according to the operation state is not identical to the current child lock state, control the at least one of the plurality of child lock latches depending on the operation state.

6. The system of claim 4, wherein the plurality of child lock latches comprise a rear left door latch and a rear right door latch, and
wherein the controller is configured to:
display a child lock execution state of each of the rear left door latch and the rear right door latch by turning on, blinking, or turning off an indicator light.

7. The system of claim 1, further comprising:
a cluster configured to display an execution state of the child lock according to the proximity warning signal when the vehicle is turned off, during at least a predetermined time.

8. A safety exit assist method for assisting a passenger to safely alight from a vehicle by controlling a plurality of child lock latches configured to execute child lock or child lock release at at least one processor, the method comprising:
verifying whether a proximity warning signal for a rear of the vehicle is received from a BSD device;
if the proximity warning signal is received, verifying a direction corresponding to the proximity warning signal between a rear left direction and a rear right direction of the vehicle;
verifying a latch corresponding to the direction among the plurality of child lock latches;
verifying a position signal from the latch corresponding to the direction; and
if verifying that the child lock is released by the position signal, instructing the latch corresponding to the direction to execute the child lock.

9. The method of claim 8, further comprising:
if verifying a collision state, instructing the plurality of child lock latches to execute the child lock release.

10. The method of claim 9, wherein the instructing to execute the child lock release comprises:
failing to execute the child lock depending on an operation of at least one of the plurality of switches configured to manually operate the child lock and the proximity warning signal verified after verifying the collision state.

11. The method of claim 8, wherein the instructing comprises:
if at least one of a plurality of switches configured to manually operate the child lock is operated, verifying an operation state of the at least one switch; and
instructing a latch corresponding to the at least one switch among the plurality of child lock latches to execute the child lock or the child lock release depending on the operation state.

12. The method of claim 11, wherein the instructing comprises:
verifying a current child lock state based on a position signal from at least one of the plurality of child lock latches; and
if a child lock state according to the operation state is not identical to the current child lock state, controlling the at least one of the plurality of child lock latches depending on the operation state.

13. The method of claim 11, wherein the plurality of child lock latches comprise a rear left door latch and a rear right door latch, and
wherein the instructing comprises:
displaying a child lock execution state of each of the rear left door latch and the rear right door latch by turning on, blinking, or turning off an indicator light.

14. The method of claim 8, further comprising:
displaying, by the at least one processor or a cluster configured to communicate with the at least one processor, an execution state of the child lock according to the proximity warning signal when the vehicle is turned off, during at least a predetermined time.

* * * * *